Jan. 2, 1968  D. G. COWLIN  3,361,194
WASTE WATER GRAVITY HEAT RECLAIMER
Filed June 27, 1966  2 Sheets-Sheet 1
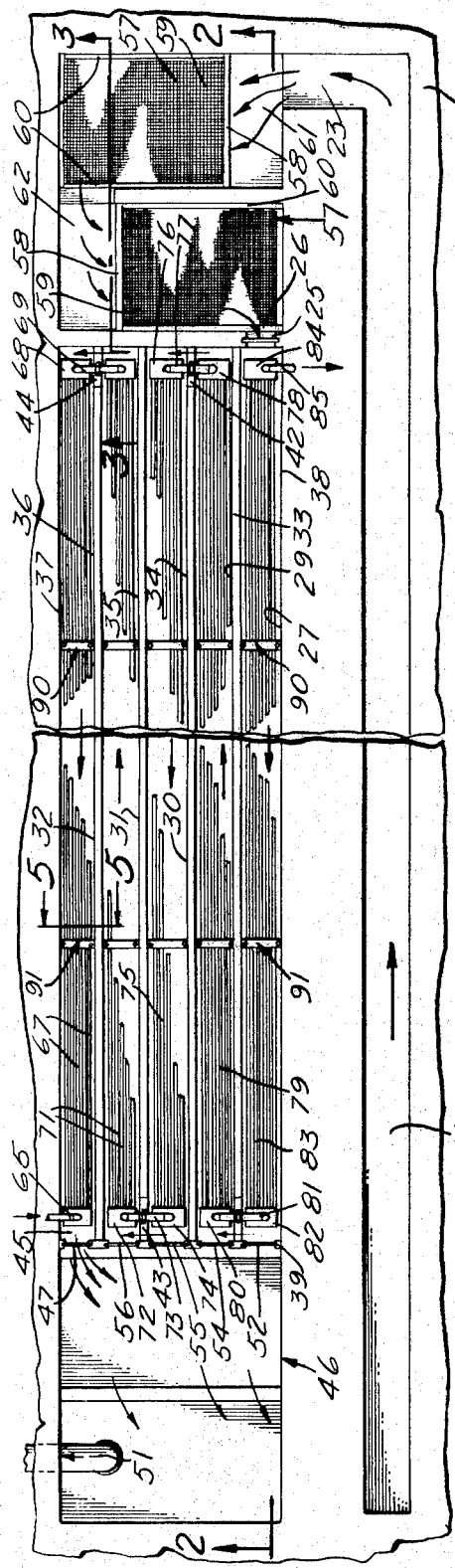
Fig. 1.
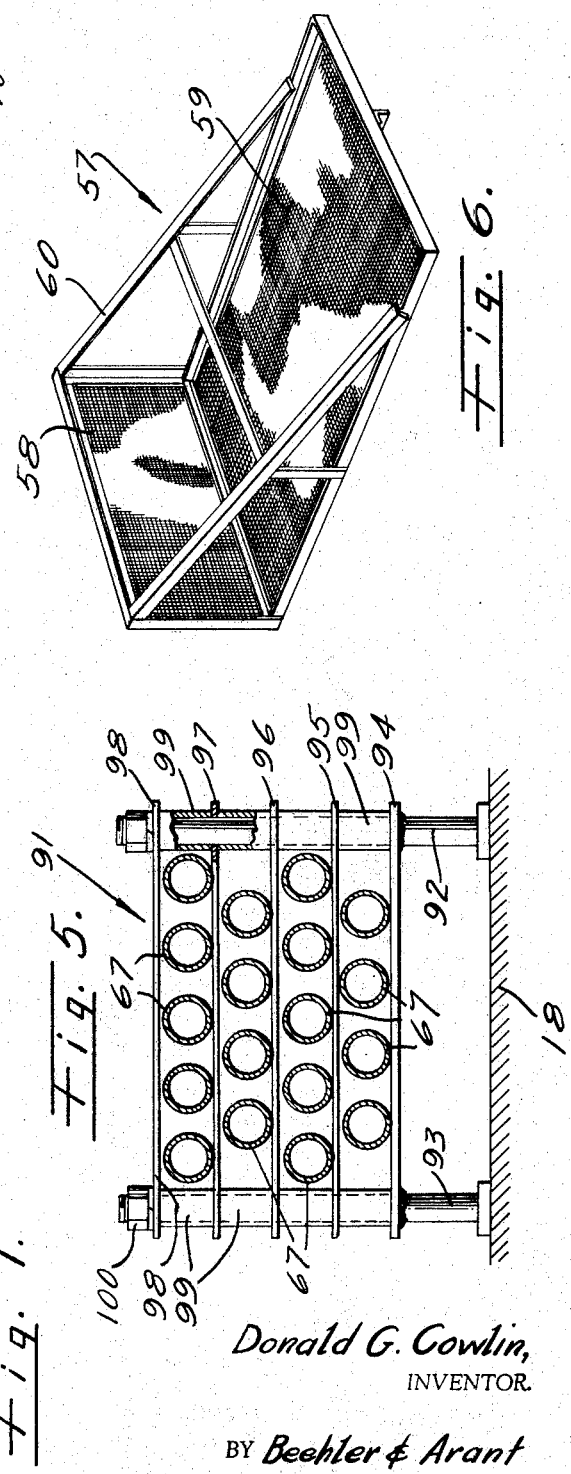
Fig. 6.
Fig. 5.
Donald G. Cowlin,
INVENTOR.
BY Beehler & Arant
Attorneys

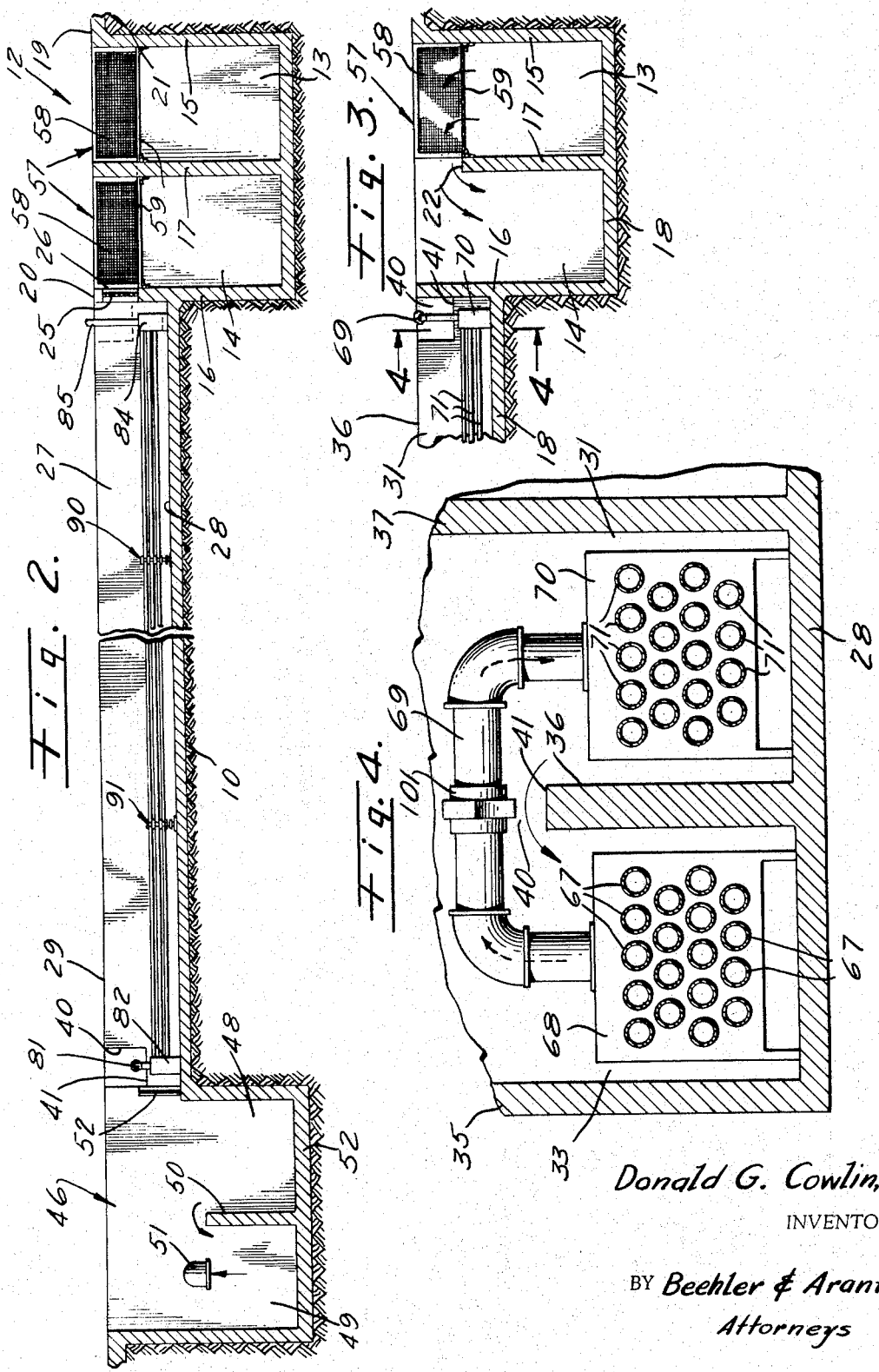

3,361,194
WASTE WATER GRAVITY HEAT RECLAIMER
Donald G. Cowlin, 555 Riverdale,
Glendale, Calif. 91204
Filed June 27, 1966, Ser. No. 560,406
9 Claims. (Cl. 165—66)

The invention relates to heat exchangers as that term is commonly known, but has special reference to the reclaiming of heat from waste wash water which is normally discharged into a sewer in a system wherein the heat is transferred to incoming cold water before it is sent to the hot water heater.

While the art of heat exchangers has been abundantly exploited, attention has focused for the most part on closed heat exchanger systems, where liquids are involved, and wherein the liquids are relatively clean and free from dirt during their passage in a counterflow direction through pipes or else, if one or another of the liquids is initially dirty, it is substantially cleaned before being passed through the system. Water which emerges from the washing machines of commercial laundries is not only dirty and loaded with detergents, soaps and what is left of the reaction of such detergents and soaps with dirt, but also carries with it a great deal of solid materials such as lint loosened by friction from the fabrics which are washed. Although some of the dirt and solid materials can be extracted from the liquid waste water, effective cleaning and purifying is impractical as a matter of practice and economically not worthwhile.

It is therefore among the objects of the invention to provide a new and improved waste water heat reclaimer which makes use of the hot waste water without more than a casual elimination of dirt and debris carried with it and to provide for an effective transfer of waste water heat while on its way to the sewer to clean cold water which is carried through the system.

Another object of the invention is to provide a new and improved waste water heat reclaimer which is a gravity operated system requiring no pumps for the successful handling of inflow and outflow liquids.

Another object of the invention is to provide a new and improved waste water gravity heat reclaimer wherein waste water which is only partially cleaned of impurities is made use of in a system which on occasions can be substantially opened and flushed from end to end quickly and by use of crude and readily available flushing means and thereafter promptly reconditioned for continued operation.

Still another object of the invention is to provide a new and improved screening device for a waste water gravity heat reclaimer which is so constructed that it does not readily become clogged with solids for substantially long periods of time and which in the event of clogging can be easily removed and cleared.

Still another object of the invention is to provide a new and improved waste water gravity heat reclaimer wherein tube supports of special low cost construction and which are easy to install are employed for the support of clean cold water liquid, the supports and tube mounting appurtenances being easy to maintain and easy to flush clean.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a plan view of a waste water gravity heat reclaimer system showing by means of arrows the direction of flow of liquids therethrough.

FIGURE 2 is a longitudinal sectional view on the line 2—2 of FIGURE 1.

FIGURE 3 is a fragmentary longitudinal sectional view on the line 3—3 of FIGURE 1.

FIGURE 4 is a cross-sectional view on the line 4—4 of FIGURE 3.

FIGURE 5 is a cross-sectional view on the line 5—5 of FIGURE 1.

FIGURE 6 is a side perspective view of one of the screen devices used in the system.

In an embodiment of the invention chosen for the purpose of illustration there is shown a waste water gravity heat reclaiming system which provides for the passage back and forth of waste water from an inflow trap where waste water enters the system to an outflow trap where waste water leaves the system on its way to the sewer, there being provided also a counterflow system of pipes for the accommodation of clean cold water the flow of which is reverse in its direction with respect to the waste water. The inflow trap is provided with screens and the screens and trap work together to precipitate some of the heavier larger solid materials before the waste water passes through the system carrying with it the smaller solid materials and dissolved dirt and related ingredients. The system here under consideration is one adapted to be built into a supporting surface 10 which may be the ground beneath a building where the device is installed. Commercial washing machines (not shown) are located adjacent to the system and are designed to be capable of passing hot waste water at the end of a washing operation into a primary trench 11. From here the hot waste water passes to an inflow trap indicated generally by the reference character 12. The inflow trap is built with two separate wells 13 and 14, these wells being preferably constructed of reinforced concrete walls 15, 16 with a dividing wall 17 between them, the wells being provided with a bottom wall 18. Top edges 19 and 20 of the walls may be substantialy flush with the top 21 of the supporting surface 10. A top edge 22 of the dividing wall 17 provides a passage from the well 13 to the well 14 so that hot waste water after passing into the well 13 by way of a secondary trench 23 from the primary trench 11 can flow into the second well 14 without spilling over the top edges 19 and 20.

A substantially conventional hydraulic flow control gate 25 is in communication with an outflow port 26 from the inflow trap by way of the well 14. Due to the fact that there is an irregularity of the flow of waste water as it is dumped from the washing machines, the flow control gate 25 provides a storage behind it so that by its adjustment a more even flow can be maintained through the trench system. The wall above the gate is several inches below the floor so that in case of accidental overflow, the water will pass over the top of the wall into trench 27. The flow control gate 25 on the opposite side is in communication with an open trench 27 which has a bottom 28 at a level substantially higher than the bottom wall 18 of the inflow trap 12. Actually any number of trenches can be used but as shown by way of example, the open trench 27 is one of a series of five open trenches, the others being identified by the reference characters 29, 30, 31, and 32 all located side by side in parallel relationship. For convenience and economy, one wall 33 serves both trenches 27 and 29, a second wall 34 serves the open trenches 29 and 30, a third wall 35 serves the trenches 30 and 31, and the fourth wall 36 serves the open trenches 31 and 32. An outside wall 37 forms the opposite side of the open trench 27 and an outside wall 38 forms the remaining wall of the open trench 27. The bottom 28 may be common to all of the trenches, and hence all trenches may be of the same depth and horizontal from end to end. All of the open trenches 27, 29, 30, 31, 32 abut against the wall 16 of the inflow trap 12 and terminate in a cross-wall 39 at the opposite end of each.

It is of particular interest to note that there is a passageway 40 formed by a cutout in the wall 33 which separates the open trench 27 from the open trench 29. A bottom edge 41 of the passageway 40 is at a level substantially higher than the bottom 28 of the trenches. There is a similar passageway 42 at the opposite end of the open trench 29 connecting it with the open trench 30. Similarly, a passageway 43 connects the trenches 30 and 31 at the ends opposite the passageway 42 and a passageway 44 connects the open trenches 31 and 32 at the ends remote from the passageway 43. These last identified passageways serve the purpose of preventing debris from passing from one trench to another. An end 45 of the open trench 32 is adapted to communicate with an outflow trap indicated generally by the reference character 46 over a gate 47. The outflow trap 46 is preferably divided into a receiving well 48 and a discharge well 49, these wells being separated by a dividing wall 50, and the discharge well being in communication with a sewer 51. A bottom 52 of the outflow trap 46 may be at substantially the same level as the bottom wall 18 of the inflow trap 12.

Although the gate 47 may be described as a flow control gate for controlling the liquid level in the trenches, the gate is removable for flushing when occasion for cleaning arises. Similarly, a gate 53 can be raised to provide communication between the trench 27 and the receiving well 48. Gates 54, 55, and 56 likewise accommodate respectively the open trenches 29, 30, and 31. The gates just described are merely sliding gates which can be lifted out when desired from tracks containing them, details of which have not been shown because of being substantially conventional construction.

For screening out some of the debris such as lint and similar materials which are carried through the primary trench 11 and connecting trench 23, the wells 13 and 14 of the inflow trap 12 are each provided with a screen of special construction like the screen indicated generally by the reference character 57 in FIGURE 6. The screen includes an upright member 58 and a substantially horizontal member 59 secured together in right angular relationship by diagonal bracing 60. It will be noted that the length of the horizontal member 59 is less than the distance across the well 13 so that a clear space 61 is provided for hot waste water enabling it to pass down into the well 13 without all of it passing through the upright member 58 of the screen. Some of the waste water, of course, passes through the upright member of the screen and the screen serves to screen out some of the debris. The remainder and major portion of the debris is however given an opportunity to precipitate to the bottom of the well 13. Waste water relieved of the bulk of the solids then passes upwardly through the horizontal member 59, joining waste water which has passed through the upright member 58 and then passing together over the top edge 22 of the dividing wall 17 into the well 14. Here again, the horizontal member 59 of the screen in the well 14 is shorter than the distance across the well leaving another open space 62. The water is again screened by some of it passing through the upright member 58 of the screen in the well 14, the balance of it passing to the bottom of the well 14 and then upwardly through the horizontal member 59 of the screen in the well before being passed to the outflow port 26 and the flow control gate 25. In this way a very substantial portion of the solids has been trapped by the inflow trap 12. There will, of course, be a great deal of fine lint which will not be trapped either by the traps or the screens and which will pass through the open trench 27 and thence on through the remaining open trenches. In this manner generally the hot waste water is handled as it passes from the inflow trap 12 through sucessively the five open trenches to the outflow trap 46. Because there will always be a rather abundant accumulation of fine lint and related debris in the trenches of a system such as this, the trenches can be conveniently and completely flushed out from time to time. To accomplish this all of the gates 47, 53, 54, 55, and 56 are lifted and clean water flushed through the trenches from the opposite ends, as for example by employment of a fire hose, and the trenches in that way flushed out by the forced flow of cleaning water. After cleaning, the gates can be readily replaced for continuance of the operation.

Clean incoming cold water is supplied by a pipe 65. The pipe 65 enters a header 66 thence passing through a series of tubes 67 to a header 68 at the opposite end of the open trench 32. A common flow pipe 69 connects the header 68 with a header 70 in the open trench 31. From here tubes 71 connect with a header 72 at the opposite end from which a common flow pipe 73 connects with the header 74. Again tubes 75 connect with a header 76 thence through a common flow pipe 77 to a header 78 which supplies tubes 79. Finally a header 80 connected to the tubes 79 communicates with a common flow pipe 81 and header 82 to tubes 83 which terminate in a header 84 from which emerges a clean water outflow pipe 85.

In this fashion cold water which enters through the inflow pipe 65 by passing successively through the tubes 67, 71, 75, 79, and 83 is warmed progressively, the first warming taking place in the open trench 32 where the hot waste water is coolest and before it passes to the sewer, the final warming taking place in the open trench 27 where the clean inflow water already warmed by passage through tubes in the other trenches is warmed finally by the hot waste water in the open trench 27 which is at its highest temperture. In practice it has been found by having tubes and trenches of sufficient length to convert inflowing clean cold water at temperatures of around 65 degrees to a clean water temperature of about 125 degrees by use of hot waste water which enters the system at an average of about 145 degrees, the heat saved in this fashion is often sufficient to eliminate the need for an extra hot water heater in a commercial laundry of any appreciable size.

For supporting the tubes at intermediate locations there are provided a plurality of tube supports indicated generally by the reference characters 90 and 91. These tube supports are substantially identical in all instances and a description of only one will be provided. The tube support 91, for example, is shown in FIGURE 5 and consists of posts 92 and 93, bottom portions of which may be described as constituting a base for the support. A plurality of platforms 94, 95, 96, 97, and 98 are carried by the posts. The platform 94 is preferably welded to the posts so that its position is fixed. Spacer sleeves 99 are slid over the posts and separate the platform 95 from the platform 94. The platform 95 is slid removably over the posts in the same manner as the spacer sleeves. Platforms 96, 97, and 98 are similarly spaced and nuts 100 threadedly attached to the tops of the posts serve to bind the platforms and spacer sleeves into position.

Also as shown, tubes like the tubes 67 rest upon the platforms in successive layers but are spaced from the platform immediately above by reason of the height of the spacer sleeves being somewhat greater than the outside diameters of the tubes. In this way the tubes are freely supported in spaced relationship by the tube supports so that space remains between the tubes on all sides permitting free flow of the hot waste water around the tubes during operation of the system. The ample spacing of the tubes as well as the ample spacing of the platforms which support them also provide for a relatively free flow of debris from one end of the open trench to the other. Should it become necessary at any time to remove any one or more of the tubes, the tube supports can be readily dismantled for this servicing operation. The manner of attachment of the tubes to the respective headers is substantially identical. It is also of consequence that the headers as well as the tube supports be mounted so as to slide freely on the bottom of the open trenches so that whenever there is any adjustment necessary by reason of expansion or contraction of the tubes, they will be self-adjusting in the trenches. It is also advantageous to provide a coupling like the coupling 101 to connect opposite sides of the common connecting pipe 69 between respective headers so that the pipe can readily be disconnected and any necessary headers and connected tubes removed for servicing.

From the foregoing description it will be understood that the system is entirely a gravity flow system which is in effect an interruption of the passage of hot waste water on its way from washing machines to the sewer and that the inflowing clean cold water is merely carried at whatever pressure might be present in the line through the tubing which lies in the open gravity trenches to an outflow pipe from which it can be connected to a substantially conventional hot water heater. All locations where solid particles can collect are readily accessible for cleaning and flushing whenever that may be necessary. The system moreover is substantially open and free flowing so that it can continue in operation under the adverse conditions usually present in commercial laundries of this kind without necessity for too frequent flushing and cleaning. The absence of need for power of any kind for its operation and infrequent maintenance makes a particularly economical operation.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A gravity hot waste water heat reclaimer for installation upstream of a sewer outflow comprising an inflow trap having a bottom, an outflow trap spaced from said inflow trap having a bottom, a plurality of side walls forming a plurality of open trenches having outflow flush ports in direct communication with said outflow trap, bottoms of said trenches being above the bottoms of said traps, a waste water inflow passageway from the inflow trap to one end of one of said trenches and connecting passageways above the trench bottoms between the other end of said one trench and the next adjacent trench and between successive pairs of adjacent trenches at alternately opposite ends forming a flow path for waste water from said inflow trap to said outflow trap, a set of laterally spaced tubes of clean water in each trench, said sets being connected at alternately opposite ends providing a counterflow path for clean water from a supply end to a discharge end, a flow control gate in said inflow passageway and an overflow waste water level control gate between the outflow trap and the outflow end of the trench at the downstream end of said flow path.

2. A gravity hot waste water heat reclaimer according to claim 1 including a flush gate in each flush port adapted to be opened for flush cleaning of said trenches.

3. A gravity hot waste water heat reclaimer according to claim 1 wherein the level of the passageways between trenches is above the level of the topmost tube in the adjacent trenches.

4. A gravity hot waste water heat reclaimer according to claim 1 wherein said inflow trap has an outflow port to said waste water inflow passageway, a waste water supply port, and a screen comprising a substantially horizontal member spaced from said waste water supply port and at a level above the bottom of the inflow trap and not higher than the level of said waste water inflow passageway whereby the flow of waste water is upward through said horizontal member.

5. A gravity hot waste water heat reclaimer according to claim 4 including a screen having an upright member joining said horizontal member at a location spaced from and facing said waste water supply port.

6. A gravity hot waste water heat reclaimer according to claim 1 wherein said inflow trap has a waste water outflow port to said waste water inflow passageway, a waste water inflow port, a dividing wall separating said trap into an inflow side and an outflow side, and a screen for each side, each screen comprising an upright member spaced from an edge of said side and facing upstream and providing a clear passage to said side, and a substantially horizontal member joining said upright member at a level above the bottom of the inflow trap whereby the flow of waste water is upward through said horizontal member.

7. A gravity hot waste water heat reclaimer according to claim 1 wherein each of said sets of tubes comprises a header at each end slidably mounted in the respective trench, a plurality of tubes having respective ends attached to respective headers and a common flow pipe for all of said tubes extending from the header at each end of the set through the respective passageway to a header at the respective end of the next adjacent set.

8. A gravity hot waste water heat reclaimer according to claim 1 wherein each of said sets of tubes comprises a plurality of tube supports intermediate ends of said set, each support comprising a base, posts on opposite sides of the base, a plurality of vertically spaced platforms removably mounted on the posts for supporting vertically spaced groups of said tubes and spacers removably mounted on said posts between said platforms having a length greater than the outside diameters of the tubes and adapted to hold each platform clear of the group of tubes immediately below.

9. A gravity hot waste water heat reclaimer according to claim 1 wherein each of said sets of tubes comprises a plurality of tube supports intermediate ends of said set, each support comprising a base slidably mounted in the respective trench, posts on opposite sides of the base, a plurality of vertically spaced platforms removably mounted on the posts for supporting vertically spaced groups of said tubes, and spacers removably mounted on said posts between said platforms each having a length greater than the outside diameters of the tubes and adapted to hold each platform clear of the group of tubes immediately below, and fastening means securing said platforms and said spacers in assembled condition.

References Cited

UNITED STATES PATENTS

| 1,841,528 | 1/1932 | Gebhardt | 165—143 |
| 1,900,363 | 3/1933 | Parent | 165—45 |
| 1,703,655 | 2/1929 | Beekley et al. | 165—143 |
| 1,798,354 | 3/1931 | Ris | 165—143 |

ROBERT A. O'LEARY, Primary Examiner.

C. SUKALO, Assistant Examiner.